United States Patent [19]

DeFrees

[11] 4,011,885
[45] Mar. 15, 1977

[54] MANIFOLD-VALVE STRUCTURE

[76] Inventor: Joseph H. DeFrees, 414 Liberty St., Warren, Pa. 16365

[22] Filed: Sept. 11, 1975

[21] Appl. No.: 612,484

[52] U.S. Cl. .............................. 137/267; 137/608; 251/145; 251/144

[51] Int. Cl.² .................................... F16K 11/10

[58] Field of Search .......... 137/266, 271, 267, 255, 137/262, 608, 263; 251/36, 144, 228, 88, 357, 63.6, 268, 145

[56] References Cited

UNITED STATES PATENTS

| 353,217 | 11/1886 | Hand | 137/608 X |
|---|---|---|---|
| 1,472,265 | 10/1923 | Bell | 137/608 |
| 2,004,716 | 6/1935 | Thwaits | 137/267 |
| 2,009,639 | 7/1935 | Shield | 137/267 |
| 2,078,384 | 4/1937 | Jefferson | 137/267 |
| 2,696,361 | 12/1954 | Jensen | 137/267 X |
| 3,095,894 | 7/1963 | Jensen | 137/267 |
| 3,405,731 | 10/1968 | DeFrees | 137/561 R |
| 3,563,263 | 2/1971 | Bensen | 137/266 X |
| 3,760,842 | 9/1973 | Mikiya | 137/561 R |
| 3,777,783 | 12/1973 | Beck | 251/368 X |

Primary Examiner—Alan Cohan
Attorney, Agent, or Firm—Baldwin, Egan, Walling & Fetzer

[57] ABSTRACT

A manifold and valve structure for use with a multi-compartmented transportation tank for liquids, such as for instance a mobile gasoline or oil transportation tank. The manifold and valve structure represents a compact, comparatively lightweight arrangement which includes a plurality of adapter couplings for selective coupling of the structure to a source of the liquid or liquids to be transported in the tank compartments, with a valve coacting with each adapter coupling for controlling the flow of liquid from the multi-compartmented tank vehicle during an unloading operation, and making it possible for selective control of simultaneous discharge of liquid from a plurality of the tank compartments utilizing one discharge hose.

12 Claims, 5 Drawing Figures

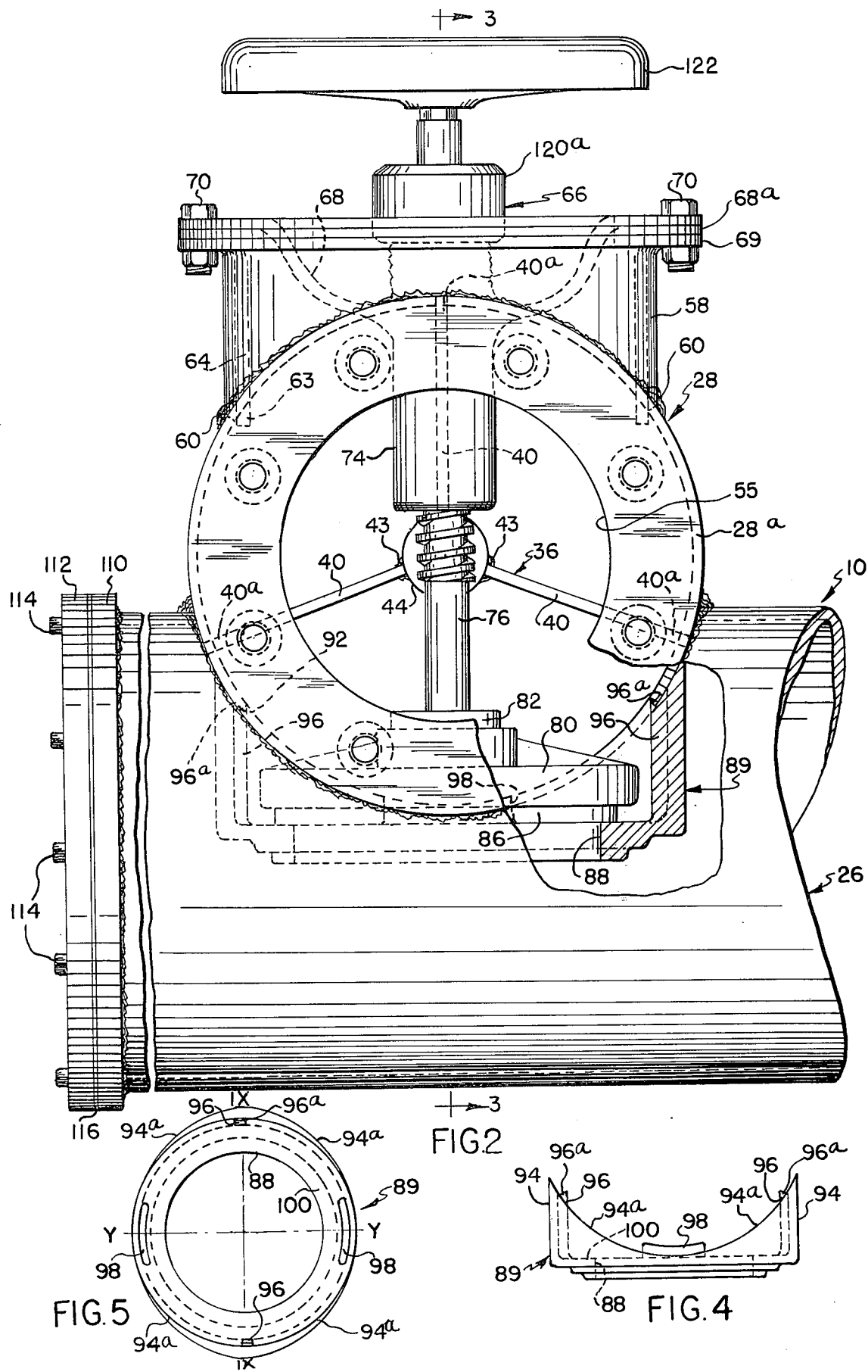

MANIFOLD-VALVE STRUCTURE

This invention relates in general to manifold-valve structure, and particularly to an improved arrangement of manifold-valve structure, adapted for use with a multi-compartment transportation tank for liquids, such as for instance inflammable liquids (e.g. gasoline or oil).

BACKGROUND OF THE INVENTION

Various arrangements are known in the art for controlling the loading and emptying of liquid from a multi-compartmented transportation tank. U.S. Pat. No. 2,453,413, issued Nov. 9, 1948, in the name of Joseph H. DeFrees and entitled Valve Structure; U.S. Pat. No. 2,557,177 issued June 19, 1951 in the name of Joseph H. DeFrees and entitled Valve Structure, and U.S. Pat. No. 3,558,097 issued Jan. 26, 1971 in the name of Joseph H. DeFrees, and entitled Valve are examples of prior art arrangements for controlling flow of inflammable liquids in connection with a multi-compartmented transportation tank vehicle.

In addition to the usual controllable valve provided at the discharge outlet of each compartment of a multi-compartmented tank, there is also usually provided in liquid flow sequence therewith, an additional valve commonly termed an "emergency" valve. The emergency valve is generally located in a relatively inaccessible portion of the tank compartment bottom, so as to be protected somewhat from shock or injury in the event of an accident to the tank. Such emergency valve in each compartment of the multi-compartmented tank is normally closed so that the valve conduit connections external thereto may suffer damage without liquid discharge from the tank.

SUMMARY OF THE INVENTION

The present arrangement of manifold and coupling valve structure provides for an individual bottom loading connection for each compartment of the transportation tank with a respective manual control valve, in sequence with each emergency valve of each compartment, to manually control the flow from each compartment during discharge of liquid from the transportation tank, and wherein simultaneous drainage of several of the compartments of the storage tank can be selectively accomplished through the aforementioned manifold-valve structure.

Accordingly, an object of the invention is to provide a novel manifold and valve arrangement for a transportation tank vehicle for liquids.

Another object of the invention is to provide an arrangement as per the above, which is lightweight, fairly easily installed and maintained, and which provides larger flow areas and more direct flow of product as compared to prior art arrangements of manifold-valve structure.

Another object of the invention is to provide a manifold-valve structure adapted for coupling to the emergency valves in the compartments of a conventional multi-compartmented liquid transportation tank, and which can be expeditiously utilized for bottom loading and unloading of the tank compartments, and wherein the control arrangement comprises a manifold or header, and a plurality of adapter couplings coacting with the header and separated therefrom by means of a respective manually actuated valve, for isolating the header from the adapter couplings, during bottom loading of the tank compartments.

A still further object of the invention is to provide a novel manifold-valve structure for both bottom loading and unloading of a multi-compartmented tank vehicle, wherein the adapter couplings for connecting the structure to the conventional loading coupler at a loading station for liquids, and wherein each adapter coupling includes a poppet for normally closing the respective liquid inlet opening in the coupling adapter unless the latter is attached to a loading coupler at, for instance, a loading station, for application of liquids to be transported during a bottom loading operation, whereby the poppet is moved to open condition.

Other objects and advantages of the invention will be apparent from the following description taken in conjunction with the accompanying drawings wherein

BRIEF DESCRIPTION OF THE DRAWINGS

FIG. 2 is an enlarged, partially broken end elevational view of the manifold-valve structure of the invention, taken generally along the plane of line 2—2 of FIG. 3, looking in the direction of the arrows.

FIG. 4 is a reduced size, elevational view of the globe valve seat member per se as embodied in the FIGS. 2 and 3 manifold-valve assembly.

FIG. 5 is a top plan view of the seat member of FIG. 4.

BRIEF DESCRIPTION OF PREFERRED EMBODIMENT

Figure 1:
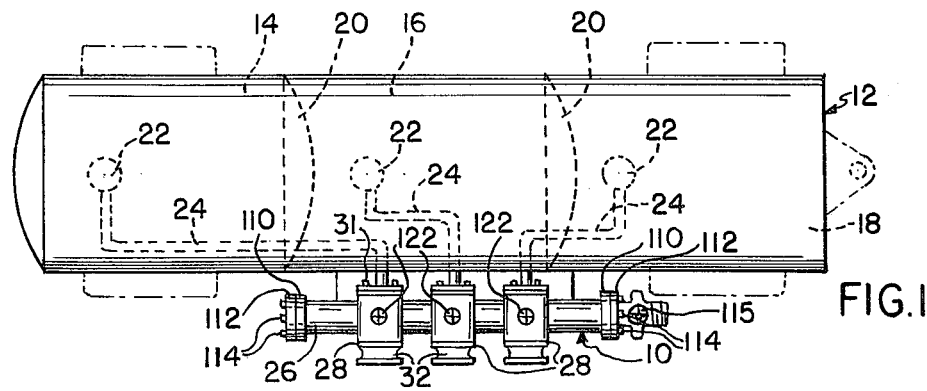
FIG. 1 is a top plan diagrammatic illustration of a multi-compartmented transportation tank vehicle, illustrating the manifold-valve mechanism of the invention coacting with the tank, and coupled to respective emergency valves associated with each respective compartment in the tank.

Referring now again to the drawings, there is shown diagrammatically in FIG. 1 a general operating relationship of a manifold-valve structure 10 embodying the invention, with the other elements of a multi-compartmented transportation tank vehicle 12. The storage tank vehicle may be adapted for receiving gasoline, oil or the like and in the embodiment illustrated is divided into compartments 14, 16 and 18. The compartments 14, 16 and 18 of the transportation tank are separated by partitions 20 from one another.

Associated with the lower portion of each compartment may be an emergency valve 22 of known construction, such as for instance, disclosed in U.S. Pat. No. 3,415,486 to Joseph H. DeFrees, dated Dec. 10, 1968, and entitled Spring Biased Tank Outlet Valve, or U.S. Pat. No. 3,392,956, to Joseph H. DeFrees, dated July 16, 1968, and entitled Valve. Each emergency valve 22 may be coupled as by means of a respective conducting line 24 to the valve and manifold structure 10 of the invention, the latter comprising a header or manifold portion 26 and a plurality of spaced adapter portions 28 mounted thereon (FIG. 1). Line 24 may be coupled to flange 28a (FIG. 3) of the body 30 of the respective adapter portion 28, by any suitable means, such as for instance by the threaded fasteners 31.

As can be seen, the manifold-valve structure is preferably of fabricated construction, with the aforementioned body 30 being preferably a cylindrical or tubular element which is provided with openings therein for mounting various of the parts forming the complete manifold-valve assembly, and as will be hereinafter described in detail.

Attached to one end of the tubular body 30 of each adapter portion is a coupling section 32 which preferably is of an exterior configuration established by the American Petroleum Institute, and which is adapted for mating coaction with a compatible loading coupler at the usual loading island. Loading of liquid into the transportation tank can occur by utilization of a conventional loading arm at the loading island, and wherein the liquid material under pressure is transmitted via the manifold-valve structure 10 into the selected compartment of the tank 12 when the respective adapter portion of the manifold-valve structure 10 is coupled to the source of liquid, during bottom loading of the tank. Coupling section 32 is preferably such that it will couple with all existing loading couplers of the usual loading islands for liquids to be transported by tank carrier 12.

Disposed interiorly of body 30, is a preferably fabricated spider 36, for movably mounting a poppet valve 38 thereon, which poppet valve is adapted to be opened by conventional means associated with the loading coupler upon coupling of the latter to the coupling section 32 of the respective adapter 28 of the manifold-valve structure.

Spider 36, in the embodiment illustrated, comprises three arms 40 each of which has a tab 40a formed thereon, which is received in a complementary opening 42 in body 30, for supporting the spider on the body. Arms 40 which are web-like relatively thin structure, support a sleeve 44 secured thereto as by welds 43, and in which is received in sliding quided relation the elongated cylindrical base stem 46 of poppet 38. Spring 48 coacting between the rear face 51 of the poppet head and the well 52 formed by the arms 40, urges the poppet valve toward closed condition. In phantom lines there is shown the maximum open position of the distal end of the poppet stem 46, when the poppet is opened, the latter being limited by the engagement of the poppet head with the forward end of the sleeve 44.

The poppet valve head may be provided with a circular recess 48a on its front face thereof, in which is disposed a sealing ring 49, held in place by a retainer disc 50 which in turn is removably secured by means of screws 53 to the poppet head. Ring 49 is adapted for sealing coaction with the deep tapered seat or defining surface of the liquid entry opening 54 in the adapter portion 28. The axis of liquid entry opening 54 is preferably generally aligned with the axis of liquid exit opening 55 (FIG. 3) in flange portion 28a of the adapter section.

It will be seen that access to the sealing ring 49 is readily accessible from exteriorly of the respective adapter section 28, thus providing for replacement of the sealing ring 49 if necessary. The deep tapered defining surface of the inlet opening 54 into the adapter section helps to prevent the poppet from binding during opening movement of the poppet valve away from the liquid entry opening. Also, such a deep tapered seat aids in providing a seal with the poppet head in the event the sealing ring 49 was damaged or inadvertently lost.

In this embodiment of the manifold-valve structure, the body 30 of each adapter section includes a top collar 58 which may be welded as at 60 in top opening 64 in the body 30. The collar 58 preferably has an inner skirt portion 63 thereon which is received in the upper opening 64 in body portion 30 of the respective adapter section, and overlaps the periphery of the opening. This aids in maintaining a fluid tight connection between the collar 58 and the adapter body, upon welding of the collar to the body 30.

A valve means 66 which in the embodiment illustrated is a globe valve, is mounted on the coller 58, with the valve 66 including a top spread head support 68 mounted on lateral flange 69 of collar 58, with a sealing gasket 68a disposed therebetween. Threaded fasteners 70 fasten the valve to the collar.

Valve 66 includes body portion 74 supported by head 68 and which is threaded as at 74a and receives therethrough in coacting relation the threaded stem 76 of the valve 66. Stem 76 includes a headed section 78 (FIG. 3) which is received in coacting relation with valve disc 80 and generally loosely held thereto by means of threaded coller 82. Disc 80 includes a circular recess 84 on its underside and receives therein a ring-like (in plan) valve seal 86 which may be formed of resilient material, for sealing the unloading opening 88 in valve seat member 89 of the manifold-valve assembly.

Seat member 89 is generally of ring-like configuration in plan, as can be best seen in FIG. 5, and is disposed or attached in a bottom opening 92 in body 30 of the adapter valve portion 28. Seat member 89 may be held in liquid tight relation in opening 92, as by welds 92a.

Figure 3:
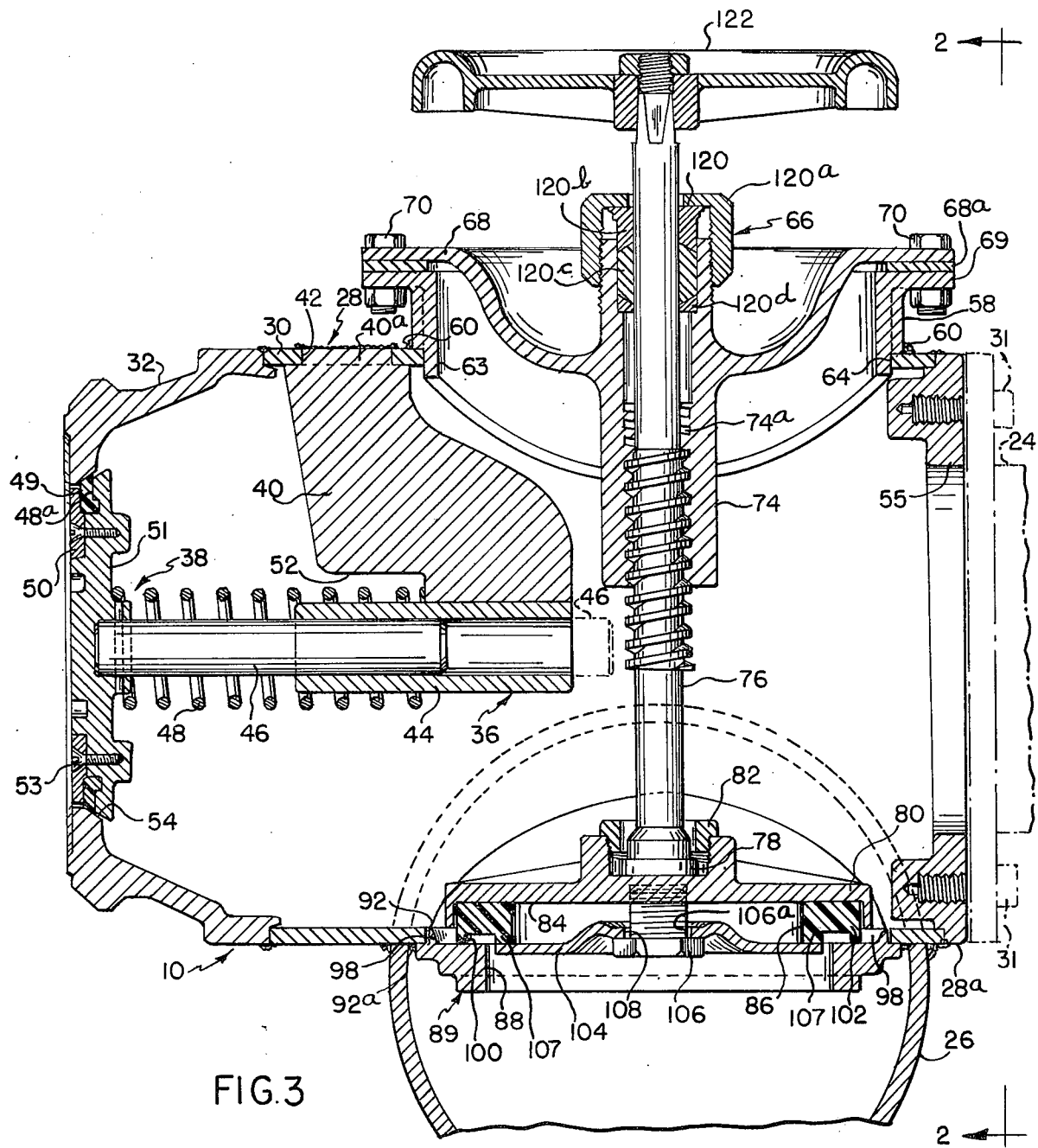
FIG. 3 is a sectional, partially broken view taken generally along the plane of line 3—3 of FIG. 2, looking in the direction of the arrows.

As can be seen in FIGS. 3, 4 and 5, seat member 89 includes sidewall portions 94 which slope downwardly as at 94a (FIG. 4) commencing adjacent the vertical plane of axis x—x (FIG. 5) of the seat members with the thickness of the wall generally thinning out as it approaches the location of the vertical plane of axis y—y (FIG. 5) of the seat member 89. Vertically elongated locater lugs 96 are preferably provided adjacent the plane of axis x—x, which have a notched top surface as at 96a, for coaction with the defining wall at the opening 92 in the body portion 30 of the adapter section 28, for positioning the seat member in the opening and providing for effective attachment by aforementioned welds 92a of the seat member to the body portion 30. Also, generally arcuate, horizontally elongated locating lugs 98 may be provided adjacent the axis y—y of seat member 89, for also expeditiously locating the seat member with respect to the bottom opening 92 in the respective body portion 30. As can be seen, as for instance for FIG. 2, seat member 89 is secured so as to be disposed in generally depending relation with respect to the body 30 of the respective adapter portion 28.

The seat member 89 provides a generally horizontal, comparatively flat top surface 100 thereon circumscribing opening 88, and which is adapted for sealing engagement by the aforementioned valve seal 86, for sealing the opening 88 from communicating the respective adapter section 28 to the manifold section 26. Seal member 86 preferably has a resilient lip 102 thereon, which enhances the sealing characteristics thereof, with the seal being held in place by means of retainer plate 104, secured as by means of a threaded bolt 106 passing through an opening 106a in the plate 104, and coacting with a threaded opening in the underside of valve disc 80. Removal of fasteners 70 permits removal of bonnet 68, to provide accessibility to replace the seal 86 of each valve member 66. Retainer plate 104 engaging depending ring portion 107 on the seal 86 aids in urging the lip portion 102 into tight sealing relation.

The ends of the manifold 26 may be provided with apertured flange sections 110 (FIGS. 1 and 2) which are closable as by means of the closure plates 112, attached as by means of threaded fasteners 114, received in threaded openings in the respective flange section 110. A sealing gasket 116 may be provided between each of the removable end plates 112 and the respective flange 110 of the manifold section, for sealing the joint therebetween. Closure plates 112 are removable, upon removal of the threaded fasteners 114, for coupling the manifold to a discharge valve 115 (gate or faucet) FIG. 1, which in turn couples to hose or pipe as by means of a conventional coupling, so that the contents of the compartments of the transportation vehicle can be drained via the manifold section, and upon opening of the respective valve 66 controlling communication between each adapter section 28 and the associated manifold section 26.

At the upper end of the aforementioned body 74 of the flow control valve 66, there may be provided a stuffing box 120 (FIG. 3) which may include a threaded nut 120a, an upper gland 120b, a packing set 120c, and a bottom gland 120d. As can be seen from FIG. 1, there is a plurality of adapter connections and valve structures coupled or associated with the manifold, one adapter and valve section being adapted for coaction with each of the compartments of the storage tank.

When it is desired to bottom load the tank vehicle 12, a loading arm or loding hose is attached to the coupler section of one or more of the adapter valve sections 28. When the conventional control lever on the loading coupler is actuated, it automatically pushes open the poppet 38 in the respective adapter valve section, thus opening the adapter to flow of liquid material from the supply source. The liquid flows via inlet opening 54 through outlet opening 55 and thence through the respective line 24 to the associated compartment of the transportation tank. When the aforementioned control lever on the loading coupler is closed, the spring 48 on the poppet 38 of the adapter valve portion automatically moves the poppet head to closed condition in opening 54. The arrangement provides a dry disconnect, so that no liquid is lost upon disconnecting of the loading coupler from the coupling section 32.

Now when it is desired to unload the transportation vehicle, the manual valve 66 on the selected adapter section 28 may be actuated by means of its handle 122, thereby raising the stem 76 and associated valve disc 80 to the desired elevated position. Liquid flowing through the respective emergency valve 22 and line 24 from the selected tank compartment, flows through opening 55 in flange 28a in the manifold-valve structure, and since the valve disc 80 is opened and the poppet 38 is closed, the liquid product flows down by gravity through unloading opening 88 into manifold section 26. Manifold 26 can be coupled at its ends or at any other outlet therein provided, and by any suitable means, such as a hose or the like, to the location to which the liquid in the tank compartment is to be passed, thus passing the product to the desired location. It is possible to unload one or more of the compartments at the same time, since opening of the valve 66 in the respective adapter section of the manifold-valve assembly controls the flow of product from the respective compartment into the common manifold section 26.

By providing suitable markings (not shown) on the upper end of the stem 76 of the rotatable control valve 66, the amount that the valve is open is readily ascertainable by merely looking at the valve after actuation by the handle. The web-like arms 40 on the spider 36 serve as a vortex breaker during the inflow of liquid into the respective adapter compartment, and the structural arrangement is such that substantial weight is saved in the weight of the manifold-valve assembly thus facilitating not only the cost of manufacture of the valve, but also increasing the payload of the transportation tank. The parts of the assembly may be formed of lightweight material, such as for instance aluminum, to enhance the weight characteristics of the device.

From the foregoing description and accompanying drawings, it will be seen that the invention provides a novel manifold-valve structure which enables convenient bottom loading of a multi-compartmented liquid transportation tank, and which is relatively lightweight and compact in construction, and which can be expeditiously manufactured, and a control structure which provides for expeditious control for unloading or emptying of the compartments of the transportation tank, to the manifold section of the control structure.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In a liquid control means for controlling liquid flow to and from a multi-compartmented liquid storage tank, said means comprising a manifold extending lengthwise and a plurality of spaced adapter portions, each of which extends in a direction generally transverse of the direction of extension of said manifold, and being nested at one side thereof in said manifold, each said adapter portion having an aperture in the opposite side thereof with a collar projecting from said aperture, said collar supporting thereon an actuatable valve including a stem and a valve head which extends inwardly into said adapter portion in a direction toward said manifold, a valve seat formed adjacent said one side of said adapter portion and defining an opening communicating the interior of said adapter portion with the interior of said manifold, and said valve head being adapted to engage said seat to seal the manifold from said adapter portion interior, said valve head upon predetermined actuation of said valve being adapted for movement away from said valve seat to communicate the interior of the respective of said adapter portions with the interior of said manifold, each said adapter portion including a coupling section having means thereon for coupling it to a source of liquid for supplying the latter to the associated tank via said adapter portion, said adapter portion including an inlet opening in said coupling section for such liquid and an exit opening spaced from said coupling section and in generally aligned relation to said inlet opening, said exit opening being adapted for communication with the tank and said valve being adapted to control the flow of liquid from the associated tank via the respective of said adapter portions to said manifold, said valve head when in closed condition being in generally non-interfering condition to the flow path of liquid from said inlet opening to said exit opening.

2. Control means in accordance with claim 1 wherein said valve includes a bonnet in which is threadedly received said valve stem, said bonnet being supported by said collar, and sealing means coacting between said bonnet and said collar and between said stem and said bonnet for preventing inadvertent escape of liquid from interiorly of said adapter portion, and said valve seat being supported in depending relation from the respective of said adapter portions and received in said manifold, said valve opening of said valve seat being disposed adjacent the lowermost area of said adapter portion to communicate the interior of said adapter portion with the interior of said manifold upon raising of said valve head from sealing engagement with said seat.

3. A control means in accordance with claim 1 wherein said valve seat comprises a ring-like member having means suspending said valve seat in said manifold, each said adapter portions being of cylindrical configuration and said manifold likewise being of cylindrical configuration with said cylindrical configuration of said adapter portion at its lower side comprising said one side nesting in the upper confronting side of said manifold, with the lengthwise axis of said adapter portion disposed above the level of the uppermost extremity of said manifold, and with the lower most extremity of said adapter portion being disposed at a level above the lengthwise axis of said manifold, said inlet and exit openings of each adapter portion being generally aligned along said adapter portion axis, and said stem extending generally transverse of said adapter portion axis and passing through the latter.

4. A control means in accordance with claim 1 including a poppet mounted in each said adapter portion adapted to close said inlet opening for liquid in said adapter portion, and means automatically urging said poppet toward closed condition.

5. A control means in accordance with claim 1 wherein said coupling section means on each said adapter portion includes a coupling configuration of the American Petroleum Institute type on the exterior of the respective coupling section for coupling with a compatible loading coupler of a loading island for liquid, for automatically coupling the respective adapter portion to the loading coupler, for supplying the liquid via said adapter portion to the associated tank.

6. A control means in accordance with claim 1 wherein each said adapter portion comprises a hollow cylindrical-like body section having at one end thereof said coupling section, said liquid inlet opening therein being disposed in the distal end of said coupling section, said coupling section being adapted for attachment to a loading coupler of a loading island for liquid, and at its other end having a flange section with said liquid exit opening therein, and adapted for coupling to a fluid line which in turn is adapted for coupling into one of the compartments of the associated storage tank, and a poppet mounted in said adapter portion, and normally closing said inlet opening, and means urging said poppet toward closed condition.

7. A control means in accordance with claim 3 wherein said valve head has a removable sealing ring coacting therewith, said sealing ring being adapted to be positioned by said head into sealing relationship with the confronting ring-like member of said valve seat, upon predetermined actuation of said valve.

8. A control means in accordance with claim 6 wherein said inlet opening has a deep tapered defining surface, said poppet having a sealing means coacting with the poppet head and having a taper thereon generally complementary to the taper on said defining surface of said inlet opening.

9. A control means in accordance with claim 8 wherein said poppet includes an elongated mounting stem and a spider mounted in said adapter portion slidingly mounting said stem therein in operative position for coaction with said inlet opening, said spider being operative to aid in controlling the flow of liquid from said inlet opening to said exit opening as it passes through said adapter portion.

10. A control means in accordance with claim 2 wherein said adapter portions are of fabricated construction of cylindrical-like nature, including a tubular body having an externally configured coupler head comprising said coupling section and said means thereon, secured thereto at one end thereof, and at the other end thereof comprising a flange secured thereto, said flange having said exit opening therein, and said valve head having a sealing ring secured thereto which is adapted for sealing coaction with said valve seat, said sealing ring being accessible for replacement upon removal of said bonnet from said collar.

11. In combination, a multi-compartmented storage tank, and a control valve structure for controlling the flow of liquid into and from the compartments of said tank, and including an emergency valve coacting with each of said compartments, for preventing accidental discharge of liquid from the respective compartment, said control valve structure comprising a manifold section and a plurality of adapter sections coacting with said manifold section and mounted in nested relation thereon, and a manual valve means for manually communicating the respective adapter section to said manifold section, said valve means including a valve head disposed in the respective adapter section and adapted when in closed condition for sealing engagement with a valve seat communicating the respective adapter section with said manifold section, line means connecting the adapter section to the respective emergency valve of the respective tank compartment, said adapter section comprising a liquid inlet opening therein and a spaced liquid outlet opening therein and defining a liquid flow path, said outlet opening being connected to the respective line means, said inlet opening being adapted for coupling to a conventional coupler of a loading island for loading liquid into the respective tank compartment, said inlet and outlet openings being disposed generally in line with one another, said valve means including a valve stem coupled to said valve head and extending upwardly generally transverse to said flow path of the respective adapter section and from the exterior of the respective adapter section and being accessible for moving said valve head from said closed condition to communicate said adapter section to said manifold for permitting discharge of liquid from a respective compartment of said tank through said respective adapter section to said manifold, said valve head when in said closed condition being in generally non-interfering condition to said flow path between said inlet and outlet openings, and poppet means for automatically closing said inlet opening of said respective adapter section for normally maintaining said inlet opening of said respective adapter section in closed condition, except when liquid is being supplied to said inlet opening by the coupler of a loading station.

12. The combination in accordance with claim 11 wherein said control valve structure is of fabricated construction, said adapter and manifold sections being formed of aluminum tubular-like components welded together, each said adapter section comprising a tubular body having at one end thereof a coupling section welded thereto, and at the other end thereof a flange secured thereto, said coupling section being adapted to be coupled to the coupler of a loading island, and said flange being attached to the respective line means, said inlet opening being disposed in the distal end of said coupling section and said outlet opening being disposed in said flange, each said adapter section having a collar projecting therefrom and welded to said body, said valve means including a removable bonnet secured to said collar and supported thereon in encompassing liquid sealing relation to said stem, and means on said collar aiding in maintaining a liquid tight connection at the attachment of said collar to said body.

* * * * *